(No Model.)
W. ERWIN.
PROCESS OF MAKING HYDROGEN PEROXIDE.
No. 440,792. Patented Nov. 18, 1890.
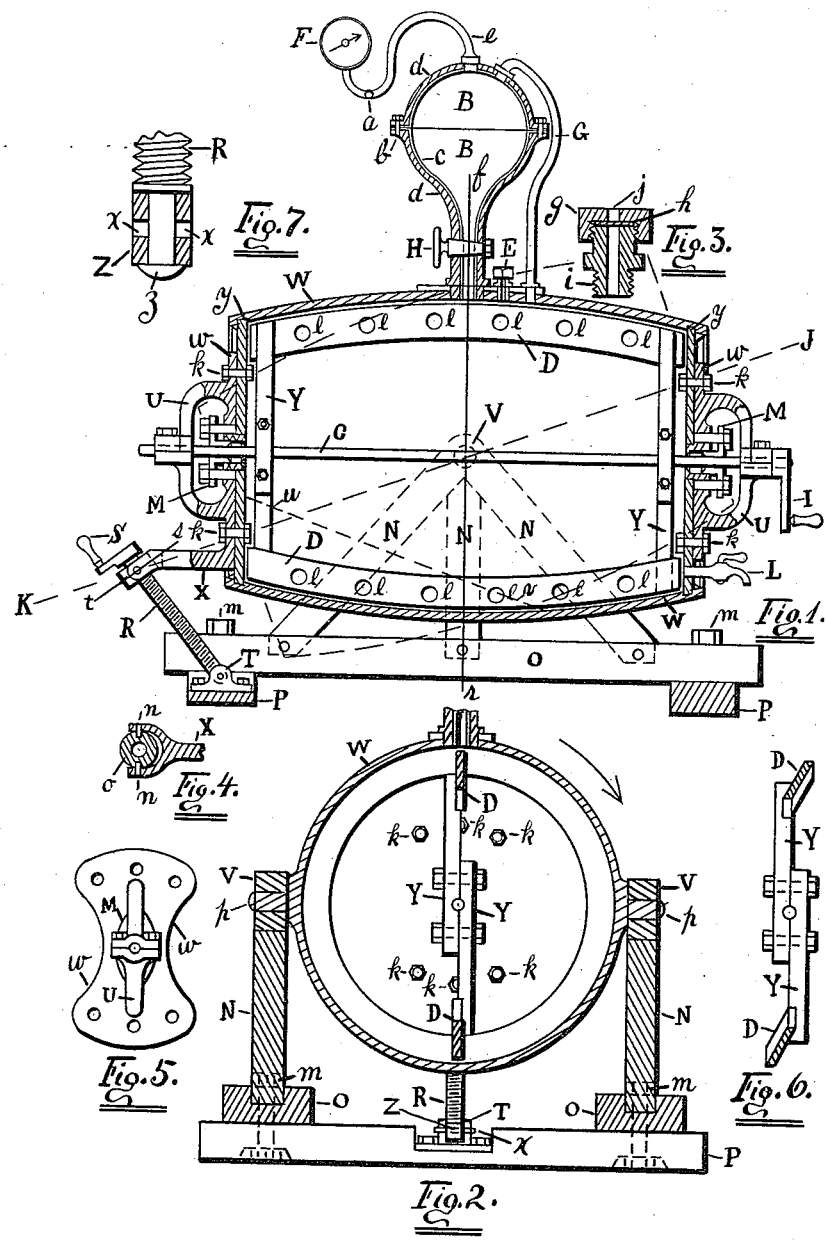
WITNESSES:
George L. Battersby
Andrew Keiser
INVENTOR
Wm. Erwin M.D.

UNITED STATES PATENT OFFICE.

WILLIAM ERWIN, OF PHILADELPHIA, PENNSYLVANIA.

PROCESS OF MAKING HYDROGEN PEROXIDE.

SPECIFICATION forming part of Letters Patent No. 440,792, dated November 18, 1890.

Application filed August 20, 1889. Serial No. 321,432. (No specimens.)

*To all whom it may concern:*

Be it known that I, WILLIAM ERWIN, a citizen of the United States, residing at Holmesburg, in the city and county of Philadelphia, and State of Pennsylvania, have invented certain new and useful Improvements in the Manufacture of Hydrogen Peroxide; and I do hereby declare that the following is a full, clear, and exact description of the invention, which will enable others skilled in the art to which it appertains to make and use the same.

Heretofore hydrogen peroxide has been made by adding in small portions, from time to time, the peroxide of barium, calcium, potassium, sodium, or strontium, mixed with water, to a diluted acid contained in a vessel surrounded by a refrigerating mixture, the liquid being gently stirred to facilitate the reaction.

My invention consists in the manufacture of hydrogen peroxide by the addition of such an acid as is ordinarily used for the purpose to an oxide (protoxide or peroxide) of lead, chromium, or manganese, previously intimately mixed with water and kept in gentle agitation during the reaction, and in conducting the process under pressure, varying in amount, according to the size of the vessel used, from a few pounds to fifty or more pounds if the vessel be very large, thereby avoiding all effervescence of newly-formed hydrogen peroxide, and also the necessity of using any refrigerant.

In order that my invention may be clearly understood, I have illustrated in the annexed drawings one practical form thereof, and will proceed to describe it.

Figure 1 is a sectional elevation of my apparatus for making hydrogen peroxide, taken through the axis of rotation of the dasher-shaft. Fig. 2 is also a sectional elevation on the line $f r$ of Fig. 1, looking from the right, with the acid-chamber broken away. Figs. 3, 4, 5, and 7 are details of Fig. 1, Fig. 4 being taken in lateral section on line $s t$ of Fig. 1 and showing the female screw $o$ pivoted upon pins $n n$. Figs. 3, 4, and 7 are drawn upon an enlarged scale. Fig. 6 shows a modified form of attaching the dashers D to the arms Y.

The vessel W $y$, of suitable size to contain the quantity of hydrogen peroxide desired to be made at one operation, balanced upon laterally-placed trunnions $p p$, is preferably barrel-shaped, but may be of cylindrical, spherical, frusto-conical, or other suitable shape, and is preferrbly placed horizontally, but may be placed at any convenient angle. It may be made of wood, as shown in the drawings, or, better still, of iron, copper, or other suitable metal, and lined with lead, platinum, gold, silver, nickel, or other substance capable of resisting the action of the acid.

E is a safety attachment, which is screwed by thread $i$ into the upper part of the vessel. The cap $g$ is screwed upon the safety attachment and holds in place the diaphragm $h$. The vent $j$ may be used for a filling-hole for the vessel, or a separate filling-hole or manhole may be made.

L is a faucet for drawing off the contents.

The dotted line J K represents the line of axis when tilted by the screw R, which is operated by crank S.

T is the bearing for the lower end of the screw, which rotates in box Z, which is pivoted upon pins $x x$, the screw being retained in the box by rivet $z$.

The dotted line $u v$ shows the approximate level of the sediment which will be deposited at the close of the operation when the vessel is tilted for that purpose.

The acid-chamber B B, shown in two sections $d d$, united at $b$ by screws or bolts, controlled by valve H, surmounted by pressure-gage F, and lined $c$ with some substance, as above mentioned, as a lining for the vessel, is of such size that the required amount of acid shall just fill it. The gage-tube $e$ may be unscrewed from the acid-chamber and the opening used for a filling-hole, or a separate filling-hole may be made. The size of the acid-chamber as compared with that of the vessel is as one to about twenty-seven and one-half, or other suitable proportion, according to the desired strength of the hydrogen peroxide to be made.

The tube G equalizes the pressure between them. The dasher-shaft C, rotating in bearings U, provided with suitable packing in the boxes M where it emerges from the ends of the vessel, may be operated by crank I by pulley and belt or by spur-gearing, or by any other well-known and suitable mechanical means.

The dasher-blades D, usually two, three, or four in number, preferably perforated by holes $l$, are set vertically edgewise on the arms Y, as in Fig. 2, or obliquely edgewise, as in Fig. 6, and are so distanced that when in rotation they shall run close to the inner side of the vessel, but shall not touch it. The dasher-shaft, dasher-blades, and arms are coated with the same material that lines the acid-chamber.

The dasher-shaft bearings U, by means of their flanges $w$ and the lug X, are secured to the vessel by bolts $k$.

In Fig. 1, $a$ is a cock for drawing off accumulations of moisture in gage-tube $e$.

The mounting frame or stand, composed of P O O N N N, secured by bolts at $m\ m$, receives the vessel-trunnions at V V.

In operation the moistened oxide is placed in the vessel W $y$ while it is in the horizontal position, with sufficient water, so that when the acid is all added it shall be almost full, only a very small air-space being allowed to remain. The acid-chamber is filled with the strong or concentrated acid, and while the contents of the vessel are maintained in a condition of gentle agitation throughout the reaction by the revolution of the dashers the acid is allowed to trickle slowly into it. This reaction is conducted at any ordinary temperature and should be accomplished slowly, so as to avoid undue internal pressure by the tendency of the newly-formed hydrogen peroxide to escape into the air-space in the upper part of the vessel. After sufficient time has elapsed for the reaction to be complete the revolution of the dashers is ceased by means of the screw R, the vessel is tilted, as indicated by the dotted line J K, and the matters in suspension allowed to subside, after which the clear liquid may be drawn off through the faucet after the safety-cap has been opened. The amount of oxide used should be so proportioned to the amount of acid that a slight excess of undecomposed oxide shall remain after the acid is all neutralized, so as to prevent the presence of any free acid in the finished preparation. The exact amounts of oxide and of acid which will be required are calculated according to the chemical law of atomic equivalents and combining proportions. Consequently to obtain a fifteen-volume solution of hydrogen peroxide by means of lead protoxide and hydrofluoric acid about two and five-eighths pounds of the oxide and six fluid ounces of the acid will be required for every gallon of the finished preparation. I may also, if I wish, place in the vessel an intermediate substance, which, being decomposed, shall furnish the acid which is to act upon the oxide. For instance, the protoxide of lead being the oxide used, I may add to the vessel moistened fluor-spar and to the acid-chamber sulphuric acid. In this case the reaction is more complex, and gentle heat must be applied to secure it. This may be done by a suitable water bath, steam bath, or sand bath; or, if the vessel be made of metal and lined, as should be the case when sulphuric acid is used, the heat may be applied directly by a suitable furnace or its equivalent. The sulphuric acid will then unite with the base of the fluor-spar, forming sulphate of lime, which will be no material disadvantage, as it is practically insoluble. The liberated fluoric acid will in turn unite with the oxide, and the balance of the process be conducted as already described.

I am aware that prior to my invention generators of carbonic-acid gas for charging soda-fountains, in which were horizontal generators containing revolving agitators and surmounted by one or two acid-chambers, have been made apparently somewhat similar in construction to my apparatus for making hydrogen peroxide, but quite different in purpose and detail, because ($a$) my acid-chamber bears a necessarily definite proportion in point of size to that of the main vessel, this size being regulated by the desired strength of the hydrogen peroxide to be made; ($b$) my agitator must be of entirely different construction, as it is required to sweep close to the entire inner surface of the vessel and to produce only a very gentle agitation of its contents; ($c$) my object in using a closed vessel at all being solely to apply pressure to prevent the escape by effervescence of the newly-formed hydrogen peroxide, and also to avoid the use of a refrigerating mixture around the vessel; ($d$) my whole apparatus is differently mounted, because it is required to be operated in more than one position.

I therefore do not broadly claim the entire combination as wholly original; but

What I do claim as my invention, and desire to secure by Letters Patent, is—

1. The method of making hydrogen peroxide under pressure, said pressure being obtained either by confining upon the surface of the forming mixture that portion of the nascent hydrogen peroxide which ordinarily escapes into the atmosphere until this self-formed pressure prevents further escape or by forcing air into the containing-vessel until sufficient pressure has been obtained to prevent all effervescence of nascent hydrogen peroxide, when the reaction can be conducted without loss.

2. The method of making hydrogen peroxide by decomposition of a metallic protoxide (for example, lead protoxide) in fine powder, suspended in water, maintained throughout the reaction in gentle agitation or circulation and under pressure by such an acid ordinarily used in making hydrogen peroxide, as hydrofluoric acid.

3. The method of making hydrogen peroxide by decomposition of the peroxide of lead, chromium, or manganese in fine powder, suspended in water, maintained throughout the reaction in gentle agitation or circulation by such an acid as is ordinarily used in making hydrogen peroxide.

4. The method of making hydrogen peroxide by adding to the finely-powdered metallic oxide, (protoxide or peroxide,) suspended in water, an intermediate substance in fine powder, such, for example, as fluor-spar, which, upon treatment by an acid, such as sulphuric acid, will liberate the acid required for the decomposition of the oxide, and by gently warming such mixture sufficiently to produce the reaction, substantially as described.

5. The combination of revolving dashers, crank or power shaft, safety-cap, pressure-gage, faucet, equalizer-tube, tilting screw, and mounting-frame, substantially as described.

6. The apparatus described, comprising, in combination, the strong closed tilting vessel or receptacle, acid-chamber, revolving dashers, crank or power shafts, safety-cap, pressure-gage, faucet, equalizer-tube, tilting screw, and mounting-frame, substantially as set forth.

In testimony whereof I affix my signature in the presence of two subscribing witnesses.

WM. ERWIN.

Witnesses:
GEORGE L. BATTERSBY,
ANDREW KEISER.